DIVERTER CONVERSION CIRCUIT

Filed Aug. 13, 1953 2 Sheets-Sheet 1

INVENTOR.
HENRY W. PATTON
BY Marvin Moody
ATTORNEY

DIVERTER CONVERSION CIRCUIT

Filed Aug. 13, 1953 2 Sheets-Sheet 2

INVENTOR.
HENRY W. PATTON
BY
Marvin Moody
ATTORNEY

United States Patent Office 2,786,149

Patented Mar. 19, 1957

2,786,149

DIVERTER CONVERSION CIRCUIT

Henry W. Patton, Cedar Rapids, Iowa, assignor to Collins Radio Company, Cedar Rapids, Iowa, a corporation of Iowa Application August 13, 1953, Serial No. 374,087

13 Claims. (Cl. 307—106)

This invention relates generally to conversion circuits and in particular to improvements which minimize the unbalancing effects of rectifiers in bridge conversion circuits.

A converter circuit, which is sometimes termed a modulator circuit, changes a direct current signal into a proportional alternating current signal. Basically, it provides a switch that chops a direct current into an alternating square wave.

There are, in general, two types of converters. The first uses electromechanical switching means and the second uses electronic switching means. This invention deals with the latter type.

This invention is an improvement in the conventional converter comprising a bridge circuit. It has a rectifier or asymmetric conductor in each of two adjacent bridge arms. A commutating voltage is applied between one pair of diagonal terminals and a direct voltage is applied between another pair of diagonal terminals. The bridge arms are balanced to prevent the commutating voltage from interfering with the signal voltage.

Unfortunately, the rectifiers prevent a perfect balance under actual operating conditions.

It is the principal object of this invention to provide means that maintain a bridge conversion circuit in balance when the rectifiers are not balanced.

The imperfect balance of conventional bridge converters allows some commutating voltage to escape at the signal terminals. This undesired voltage interferes with the signal and is called noise. The amount of noise limits the minimum direct voltage signal that may be accurately converted. Many converter applications require accurate conversion of very small direct voltage signals.

It is therefore another object of this invention to provide means for reducing the noise output of a bridge converter.

It is still another object of this invention to provide a bridge converter that will accurately convert minute direct voltage signals.

Generally, the impedance of linear components such as resistors and capacitors can be accurately controlled under varying operating conditions and any error in bridge balance due to them is negligible. However, asymmetric conductors, such as germanium or selenium diodes, seldom have equal impedances even though manufactured in an identical manner, and their impedances are not subject to control in the manner of linear components.

It is yet another object of this invention to allow certain impedance dissimilarities to exist in asymmetric conductors without unbalancing a conversion bridge.

The complicated impedance structure of an asymmetric conductor, hereafter called a diode, can better be understood by the example shown in Figure 1 which shows a thirty ohm forward resistance and a 100,000 ohm backward resistance. The 300 millivolt battery represents the fact that a forward voltage which exceeds 300 millivolt is required to begin forward conduction through the diode.

The capacitor represents the inter-electrode capacitance between the diode elements.

The forward resistance will unpredictably vary from diode to diode under the same conditions and may be 30 ohms in one case and 35 ohms in another. The backward resistance will also unpredictably vary from diode to diode under the same conditions and may be 100,000 ohms in one case and 80,000 ohms in another.

However, Figure 1 is an over-simplification because diodes are not linear devices and therefore cannot be accurately represented by fixed resistors and capacitors. The impedance of a single diode varies widely and nonlinearly with the voltage across it. This is best illustrated by Figure 2 which shows current-voltage curves for three different diodes. It is seen that the impedance response is different for each diode. Diode behavior during forward conduction is more nearly approximated by the square law but, as shown in Figure 2, curve B exhibits prominent higher power terms.

No particular relationship exists between the forward and backward impedance characteristics of a diode. Therefore even though two diodes may have the same forward conduction characteristics, their backward characteristics will usually be different and vice versa.

It is therefore obvious that variations in forward and backward impedances will disturb the balance of a bridge converter. If the diodes in adjacent bridge arms have equal forward conductance curves but different backward conductance curves, the bridge will be balanced during the forward loop of commutating voltage but will be unbalanced during the backward loop of a commutating voltage. Bridge converters, prior to this invention, required diodes that had matched forward and backward impedance curves. Matching both forward and backward impedances is extraordinarily difficult and expensive.

It is another object of this invention to eliminate the necessity for matching the backward impedance characteristics of diodes in bridge converters.

This invention provides a third diode called a diverter that is connected across the bridge diodes with opposite polarity. The diverter diode shunts the current from the bridge diodes during the backward loop of commutating voltage and virtually eliminates the effect of dissimilarities in diode backward impedances. The bridge accordingly maintains a balanced state during the backward conduction cycle regardless of the unmatched backward impedance characteristic of the diodes.

Further objects, advantages and features of this invention will become apparent to a person skilled in the art upon a further study of the specification and drawings, in which.

Figure 1:
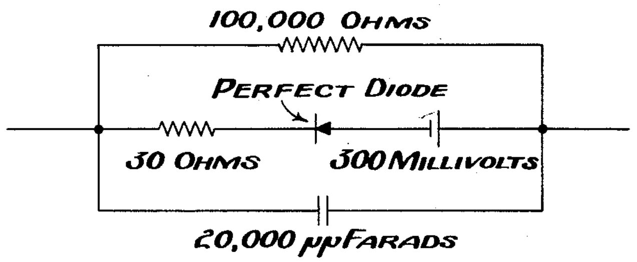
Figure 1 is an approximate equivalent circuit of a diode as stated above.
Figure 2:
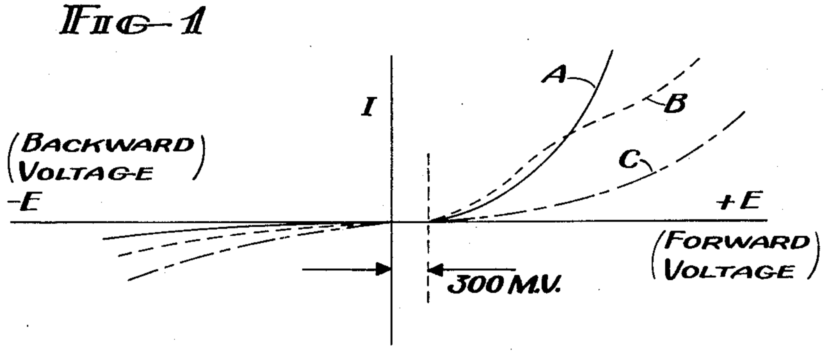
Figure 2 is a graph which shows the backward and forward conduction characteristics of three different diodes.

The diode symbol in Figure 1 indicates a perfect diode. However, the diode symbols in the remainder of the drawings indicate actual asymmetric conductors with all their practical imperfections. The terms, asymmetric conductor and diode, are used synonymously throughout the specification.

Figure 3:
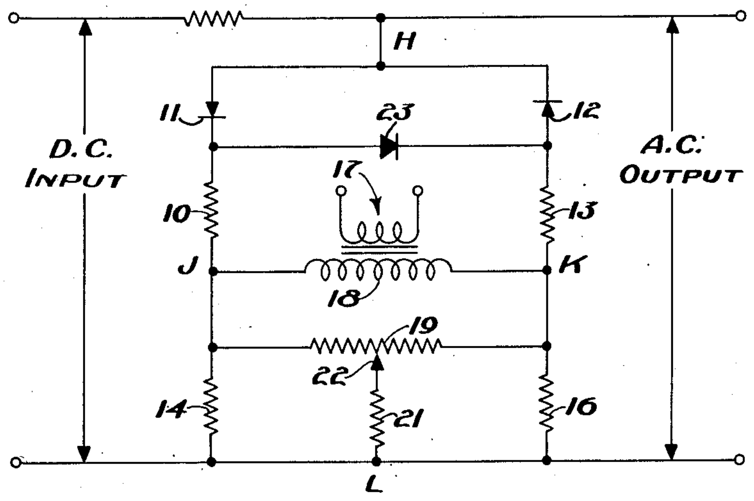
Figure 3 illustrates one embodiment of this invention.

The embodiment shown in Figure 3 is essentially a bridge circuit which has junctions or terminals H, J, L and K. The arm HJ contains a first resistor 10 and a first diode 11 in series. The arm HK contains a second diode 12 and a second resistor 13 in series. The third arm JL contains a third resistor 14. The fourth arm KL contains a fourth resistor 16.

A transformer 17 has its secondary 18 connected between terminals J and K and furnishes a commutating voltage to the bridge.

A potentiometer 19 is also connected between terminals J and K, and a resistor 21 is connected between its center tap 22 and terminal L. Potentiometer 19 and tap-connected resistor 21 merely provide adjustable resistors in parallel with the third and fourth resistors 14 and 16 to balance bridge arms JL and KL.

A diverter diode 23 is connected across arm diodes 11 and 12 in opposite polarity.

Figure 4:
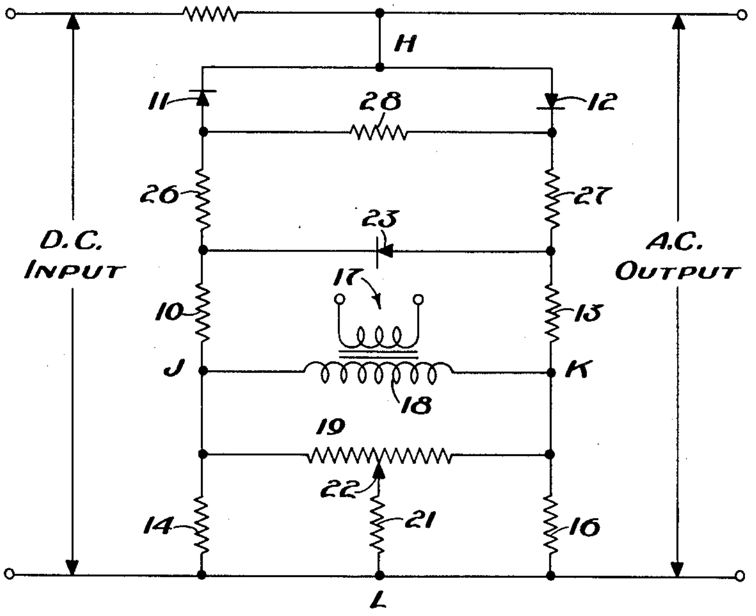
Figure 4 shows another embodiment of this invention.

Figure 4 shows another embodiment of this invention, and like parts have the same designations as previously used in Figure 3. A fifth resistor 26 is series connected between the first resistor 10 and first diode 11, a sixth resistor 27 is series connected between the second resistor 13 and second diode 12, and a seventh resistor 28 is shunted across diodes 11 and 12.

Figure 5:
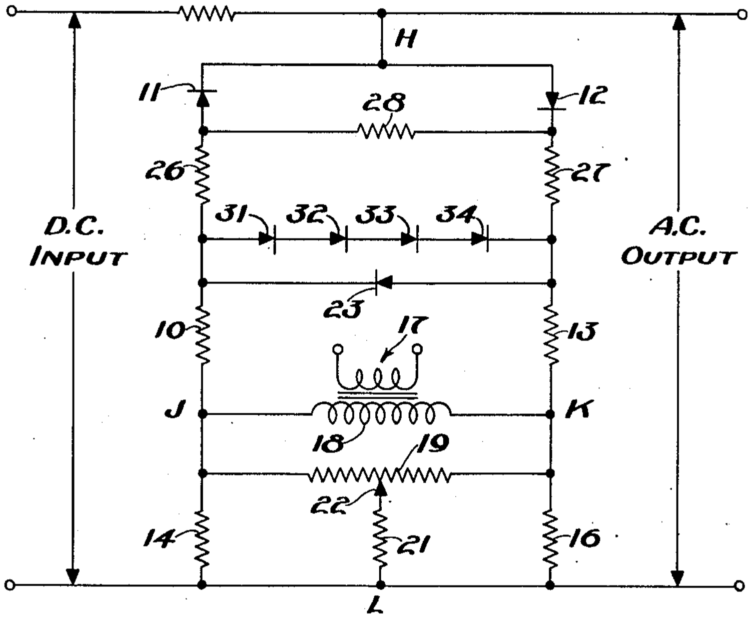
Figure 5 shows still another embodiment of this invention.

Figure 5 shows another embodiment of this invention that is essentially the same as the embodiment in Figure 4 with the further addition of four series diodes 31, 32, 33 and 34 connected across the diverter diode 23 in opposite polarity.

Let it be assumed that the bridge circuit of Figure 3 does not have diverter diode 23 and that arm diodes 11 and 12 have perfectly matched forward and backward impedances. When the direct voltage input is provided across junctions H and L, the diodes 11 and 12 are biased differently by the direct voltage; and accordingly they present forward impedances. Thus, the bridge is unbalanced during each forward loop of commutating voltage but remains balanced during each backward loop of commutating voltage because the diodes are then nonconducting. Thus, only the forward loops of alternating commutating voltage appear at the output terminals because of their unbalancing effect; and the backward loops do not appear at the output terminals because they do not unbalance the bridge. The forward loops of commutating voltage are clipped at a level equal to that of the direct current input. The output therefore has a direct current component and an alternating current component; but since the direct component is generally unimportant, the output of the invention will be treated as an alternating current output in this specification.

For the moment let us consider the operation of Figure 3 with diverter diode 23 removed from the circuit. Arm diodes 11 and 12 are randomly selected.

A perfect bridge balance is obtained only when the voltage ratio of arm HK to arm HJ equals the voltage ratio of arm KL to arm JL. The voltage ratio of arms KL and JL may be adjusted by the potentiometer tap 22.

Since the forward and backward impedances of diodes 11 and 12 are different, arms HK and HJ will have different forward and backward voltage ratios. The forward voltage ratio of arms HK and HJ is designated by $Y_F$ and their backward voltage ratio is designated by $Y_R$.

The forward impedance of the first diode 11 is designated by $D_{F_1}$ and the backward impedance of the first diode 11 is designated by $D_{R_1}$. In like manner the forward impedance of the second diode 12 is designated by $D_{F_2}$ and the backward impedance of the second diode 12 is designated by $D_{R_2}$.

The resistance of the first resistor 10 is designated by A and the resistance of the second resistor 11 is designated by B.

The forward voltage ratio of arms JH to HK is:

$$Y_F=\frac{D_{F_1}+A}{D_{F_2}+B} \quad (1)$$

Resistor values A and B, respectively, exceed the small forward diode impedances $D_{F_1}$ and $D_{F_2}$. It will be noted that the variation of voltage ratio $Y_F$ becomes smaller for a given difference in impedances $D_{F_1}$ and $D_{F_2}$ as resistance values A and B become larger. The maximum variation in ratio $Y_F$ accordingly occurs when resistance values A and B are zero. The forward voltage ratio $Y_F$ is therefore materially assisted by first and second resistors 10 and 13.

The backward voltage ratio of arms JH to HK is:

$$Y_R=\frac{D_{R_1}+A}{D_{R_2}+B} \quad (2)$$

It will be remembered that diode backward impedance is very large, being hundreds of times larger than its forward impedance. Resistor values A and B then become comparatively insignificant to impedances $D_{R_1}$ and $D_{R_2}$ in Equation 2. The backward voltage ratio will therefore be:

$$Y_R=\frac{D_{R_1}}{D_{R_2}} \quad (3)$$

Resistors 10 and 13 then have no stabilizing effect in the backward conducting direction and the full effect of the backward impedance unbalance is felt by the bridge. Therefore backward impedance dissimilarity has a far greater unbalancing effect than does forward impedance dissimilarity in a bridge converter without diverter diode 23.

Let us now consider the operation of Figure 3 as shown with diverter diode 23. During forward conduction of arm diodes 11 and 12, the very high backward impedance of diverter diode 23 prevents it from affecting bridge operation, and voltage ratio $Y_F$ is essentially as given in Equation 1.

However during backward conduction of diodes 11 and 12, the small forward impedance of diverter diode 23 is presented in parallel with the several hundred times greater backward impedance of arm diodes 11 and 12. Substantially all of the backward commutating current through arms KH and HJ is then shunted through diverter 23. Diodes 11 and 12 are bypassed. The voltages across bridge arms KH and HJ then occur across the controlled first and second resistors 10 and 13 rather than across the uncontrolled diodes 11 and 12. Whatever backward impedance dissimilarity exists between the diodes now has little effect upon bridge balance because the effect of diode impedances can only be felt by the voltage drop across them, which is shifted by diverter 23 to the balanced resistors 10 and 13. The diverter 23 then provides a backward voltage ratio of:

$$Y_R=\frac{A}{B} \quad (4)$$

When Equation 4 is compared with Equation 3, it is seen that the diverter diode causes a tremendous improvement in bridge balance during backward conduction.

The forward and backward impedances of the diverter diode are in no way critical, and their variation does not affect bridge balance because they equally shunt arm diodes 11 and 12.

The embodiments shown in Figures 4 and 5 involve the same basic theory as the embodiment in Figure 3. However, they have additional refinements which provide still better bridge balance.

The forward voltage ratio $Y_F$ is further stabilized in Figure 4 by the additional series resistance of resistors 26 and 27. They, in effect, increase values A and B in Equation 1.

The parallel seventh resistor 28 shunts a portion of the current from the diodes which aids balance during forward conduction. Sufficient voltage is still allowed across arm diodes 11 and 12 to switch the direct signal voltage.

Figure 5 shows a still further improvement in forward bridge balance over Figure 4. The additional four diodes 31, 32, 33 and 34 provide a clipping circuit for the forward loop of commutating voltage. The plurality of diodes in series provide a clipping level above the amplitude necessary for direct current signal switching. The clipped forward voltage is sufficiently large to switch the direct current signal but drives the arm diodes with a low voltage. Very large commutating voltages may then be used. A diode's high voltage forward impedance, which is generally the most unmatched part, is then bypassed. The lowered commutating voltage amplitude lowers the noise output for a specified degree of unbalance.

It is therefore apparent that this invention provides means for finely balancing a bridge conversion circuit regardless of impedance dissimilarities in its diodes. This invention eliminates the necessity for matching backward impedance characteristics and only requires that the diodes have reasonably matched forward impedances. This invention allows conversion of much smaller direct current signals than has heretofore been possible with bridge converters.

Although this invention has been described with respect to preferred embodiments thereof, it is not to be so limited as changes and modifications may be made therein which are within the full intended scope of the invention, as defined by the appended claims.

I claim:

1. A converter bridge compensated for dissimilarities in the backward impedance of its diodes comprising, first, second, third and fourth junctions, a first resistor and first diode connected in series between said first and second junctions, a second diode and second resistor connected in series between said first and fourth junctions, said first and second diodes connected so that they have opposite polarity as viewed from the first junction, a third resistor connected between said second and third junctions, a fourth resistor connected between said third and fourth junctions, a commutating transformer with its secondary connected between the second and fourth junctions, a diverter diode connected across said first and second diodes in opposite polarity with respect to the commutating secondary, a direct current source having internal resistance connected across said first and third junctions, whereby a chopped output voltage is provided across said first and third junctions.

2. A converter bridge compensated for dissimilarity in the backward impedance of its diodes comprising, first, second, third and fourth junctions, a first diode with its positive side connected to said first junction, a second diode with its negative side connected to said first junction, a first resistor connected between said first diode and said fourth junction, a second resistor connected between said second diode and said second junction, a third resistor connected between said second and third junctions, a fourth resistor connected between said third and fourth junctions, a commutating voltage source connected between said second and fourth junctions, a diverter diode connected across said first and second diodes in opposite polarity from said first and second diodes with respect to the commutating voltage, a direct current source connected across said first and third junctions, an isolation resistor connected serially to said direct current source, whereby an output voltage that is chopped at the frequency of the commutating voltage is provided at the first and third junctions and is not affected by mismatching of the back impedances of the first and second diodes.

3. A converter bridge compensated for dissimilarity in the backward impedances of its diodes comprising, first, second, third and fourth junctions, a first diode with its positive side connected to said first junction, a second diode with its negative side connected to said first junction, a first resistor connected between said first diode and said fourth junction, a second resistor connected between said second diode and said second junction, a third resistor connected between said second and third junctions, a fourth resistor connected between said third and fourth junctions, and a commutating voltage source connected between said second and fourth junctions, a diverter diode connected across said first and second diodes in opposite polarity with respect to the commutating voltage, a potentiometer connected between said second and fourth junctions, and a fifth resistor connected between the potentiometer tap and said third junction so that the ratio of the resistance between said second and third junctions to the resistance between said third and fourth junctions may be adjusted, an input provided across the first and third junctions, and a chopped output provided across the same junctions, whereby the output is not substantially affected by any dissimilarity in the backward impedance of the diodes.

4. A converter bridge compensated for dissimilarity in the backward impedances of its diodes and comprising, first, second, third and fourth junctions, first asymmetric conduction means with its positive side connected to said first junction, second asymmetric conduction means with its negative side connected to said first junction, first resistance means connected between said first asymmetric means and said fourth junction, second resistance means connected between said second asymmetric means and said second junction, third resistor means connected between said second and third junctions, fourth resistance means connected between said third and fourth junctions, a commutating voltage source connected between and providing alternating voltage to said second and fourth junctions, diverter asymmetric conduction means connected across said first and second asymmetric conduction means, an input voltage source having internal resistance and connected across said first and third junction, and an output voltage provided across the first and third junctions proportional to the input voltage but chopped at the frequency of the commutating voltage, whereby the output voltage is not substantially affected by a mismatch among the backward impedances of the various asymmetric conduction means.

5. A bridge circuit having four arms with asymmetric conduction means located in at least two adjacent arms, wherein the bridge is compensated for dissimilarity in the backward impedances of the asymmetric conduction means in the arms, and comprising, diverter asymmetric conduction means connected at one end of one of the arms having asymmetric conduction means and connected at the other end to the adjacent arm having asymmetric conduction means, the diverter and adjacent arm asymmetric conduction means comprising a circuit in which all of the asymmetric means have the same series polarity, whereby the diverter means prevents unbalance of the bridge due to backward conduction through the arm diodes.

6. A converter bridge circuit having diodes in a pair of adjacent legs and including, a diverter diode connected with opposite polarity across the diodes in the legs of said bridge circuit, whereby the diverter diode removes the effect of dissimilarities in the back impedances of the diodes in regard to maintaining the bridge circuit in balance.

7. In a bridge circuit having diodes in adjacent arms where said arm diodes are arranged with the same polarity around the circuit of the four arms of the bridge, the improvement comprising, a diverter diode connected between said adjacent bridge arms across both said arm diodes, said diverter diode arranged with opposite polarity from said arm diodes with respect to the bridge circuit, whereby the back impedance of said arm diodes is bypassed by the forward impedance of said diverter diode.

8. In a bridge circuit having arm diodes with unmatched back impedances in adjacent bridge arms, the arm diodes having opposite polarity with respect to the bridge terminal common to said adjacent arms, and a source of alternating voltage connected between the opposite bridge terminals of said adjacent arms, the improvement comprising, a diverter diode connected at one end to one of said adjacent arms and connected at the other end to the other of said adjacent arms, said arm diodes connected with one polarity with respect to the alternating source, and said diverter diode connected with opposite polarity with respect to the alternating source, whereby the bridge is not unbalanced by the unmatched back impedances of said arm diodes.

9. Means for eliminating the matching of back impedances of diodes used in bridge circuits where the bridge circuit provides diodes in adjacent bridge arms having opposite polarity with respect to the bridge junction point between said adjacent arms, the back impedance elimination means comprising, a diverter diode connected at one end to one of said adjacent arms and connected at the other end to the other of said adjacent arms, and said diverter diode forming a circuit with said arm diodes in which all of said diodes have the same series polarity.

10. A converter bridge circuit comprising, first, second, third and fourth junctions, a commutating voltage source connected between said second and fourth junctions, a first resistor with one end connected to said fourth junction, a second resistor with one end connected to said second junction, a diverter diode connected across the other ends of said first and second resistors, a third resistance connected between said second and third junctions, a fourth resistance connected between said third and fourth junctions, a fifth resistor with one end connected to the positive terminal of said diverter diode, a sixth resistor with one end connected to the negative end of said diverter diode, a seventh resistor connected across the other ends of said fifth and sixth resistors, a first arm diode with its positive end connected to said first junction and its negative end connected to said fifth resistor, a second arm diode with its negative end connected to said first junction and its positive end connected to said sixth resistor, an input source having internal resistance and connected across the first and third junctions, and a chopped output voltage provided across the first and third junctions, whereby dissimilarities in the backward and the forward impedances of said arm diodes do not cause any substantial unbalancing of the bridge circuit during a cycle of commutating voltage.

11. A converter bridge circuit comprising, first, second, third and fourth junctions, a commutating voltage source connected between said second and fourth junctions, a first resistor with one end connected to said fourth junction, a second resistor with one end connected to said second junction, a diverter diode connected across the other ends of said first and second resistors, a third resistance connected between said second and third junctions, a fourth resistance connected between said third and fourth junctions, a fifth resistor with one end connected to the positive terminal of said diverter diode, a sixth resistor with one end connected to the negative end of said diverter diode, a seventh resistor connected across the other ends of said fifth and sixth resistors, a first arm diode with its positive end connected to said first junction and its negative end connected to said fifth resistor, a second arm diode with its negative end connected to said first junction and its positive end connected to said sixth resistor, a plurality of diodes connected in series across said diverter diode but having opposite polarity with respect to said commutating voltage, an input source having internal resistance and connected across the first and third junctions, and a chopped output voltage provided across the first and third junctions, whereby dissimilarities in the backward and the forward impedances of said arm diodes do not cause any substantial unbalancing of the bridge circuit during a cycle of commutating voltage.

12. A bridge circuit having asymmetric conductors in its arms which essentially eliminates the effects of mismatched backward impedances of the asymmetric conductors and reduces the effects of mismatched forward impedances of the asymmetric conductors, comprising first, second, third, and fourth junctions, an input source connected across the first and third junctions, said input source having resistance associated with it, a source of commutating voltage that alternates at a predetermined frequency connected beween the second and fourth junctions, first resistance means connected at one end to the fourth junction, second resistance means connected at one end to the second junction, diverter asymmetric conduction means connected between the remaining ends of said first and second resistance means, third resistance means connected between the second and third junctions, fourth resistance means connected between the third and fourth junctions, fifth resistance means connected at one end to one side of the diverter means, sixth resistance means connected at one end to the opposite side of the diverter means, seventh resistance means connected between the remaining ends of said fifth and sixth resistance means, first arm asymmetric conduction means connected between the first junction and the adjacent end of said fifth resistance means, second arm asymmetric conduction means connected between the first junction and the adjacent end of the sixth resistance means, the first and second arm asymmetric means connected with the same series polarity with respect to the commutating voltage, and the diverter asymmetric conduction means connected with opposite polarity from said arm asymmetric means with respect to the commutating voltage.

13. A circuit as in claim 12 and including, second diverter asymmetric conduction means connected across said first diverter means, said second diverter means connected with opposite polarity from the first diverter means with respect to the commutating source, said second diverter means requiring a greater voltage to begin forward conduction than the combined arm asymmetric conduction means, whereby a mixmatch in the forward impedances of the two arm asymmetric means occurring above the voltage required to begin forward conduction of said second diverter means does not essentially affect the balance of the bridge circuit.

No references cited.